(12) United States Patent
Jiang et al.

(10) Patent No.: US 12,050,571 B2
(45) Date of Patent: Jul. 30, 2024

(54) GRAPHICAL USER INTERFACE TO DEPICT DATA LINEAGE INFORMATION IN LEVELS

(71) Applicant: PayPal, Inc., San Jose, CA (US)

(72) Inventors: Danfeng Jiang, Shanghai (CN); Jie Shen, Shanghai (CN)

(73) Assignee: PayPal, Inc., San Jose, CA (US)

( * ) Notice: Subject to any disclaimer, the term of this patent is extended or adjusted under 35 U.S.C. 154(b) by 296 days.

(21) Appl. No.: 17/455,257

(22) Filed: Nov. 17, 2021

(65) Prior Publication Data

US 2022/0245108 A1      Aug. 4, 2022

(30) Foreign Application Priority Data

Feb. 1, 2021   (WO) ................ PCT/CN2021/074652

(51) Int. Cl.
| | |
|---|---|
| G06F 16/00 | (2019.01) |
| G06F 3/04847 | (2022.01) |
| G06F 16/21 | (2019.01) |
| G06F 16/23 | (2019.01) |
| G06F 16/26 | (2019.01) |

(52) U.S. Cl.
CPC ........ G06F 16/219 (2019.01); G06F 3/04847 (2013.01); G06F 16/2358 (2019.01); G06F 16/26 (2019.01)

(58) Field of Classification Search
CPC ........................... G06F 16/2455; G06F 16/258
See application file for complete search history.

(56) References Cited

U.S. PATENT DOCUMENTS

| | | | |
|---|---|---|---|
| 9,075,860 B2 * | 7/2015 | Kozina | ................ G06F 16/254 |
| 2006/0106847 A1 | 5/2006 | Eckardt, III et al. | |
| 2013/0332423 A1 * | 12/2013 | Puri | ........................ G06F 16/35 |
| | | | 707/687 |

(Continued)

FOREIGN PATENT DOCUMENTS

CN      112131303 A      12/2020

OTHER PUBLICATIONS

International Search Report and Written Opinion in PCT Appl. No. PCT/CN2021/074652 mailed Nov. 2, 2021, 9 pages.

(Continued)

*Primary Examiner* — Cheryl Lewis
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to a graphical user interface (GUI) that is operable to depict data lineage information in levels. In some embodiments, data lineage information may specify a directed graph that is indicative of a data lineage associated with a plurality of data elements. For example, in the data lineage information, the plurality of data elements may be represented as a corresponding plurality of nodes and, in the directed graph, the plurality of nodes may be connected by edges in a manner that is indicative of the data lineage relationships between the plurality of data elements. In various embodiments, the disclosed techniques may generate a data lineage GUI that, for a selected data element of the plurality of elements, is usable to navigate different levels of the data lineage in an upstream and downstream direction relative to a particular level of the selected data element.

20 Claims, 11 Drawing Sheets

(56) References Cited

U.S. PATENT DOCUMENTS

| | | | |
|---|---|---|---|
| 2015/0012478 A1* | 1/2015 | Mohammad | G06F 16/254 |
| | | | 707/602 |
| 2018/0089291 A1 | 3/2018 | Vankamamidi et al. | |
| 2018/0157702 A1 | 6/2018 | Clemens et al. | |
| 2019/0050562 A1* | 2/2019 | Rhee | G06F 21/566 |
| 2021/0124755 A1* | 4/2021 | Vankamamidi | G06F 16/2455 |

OTHER PUBLICATIONS

Amnon Drori, "What is Data Lineage?" Octopai; https://www.octopai.com/what-is-data-lineage/; 4 pages. [Retrieved Oct. 9, 2020].

DOT (graph description language); Wikipedia; https://en.wikipedia.org/w/index.php?title=DOT_(graph_description_language)&oldid=985867949; last edited on Oct. 28, 2020, 6 pages.

Examples—Apache ECharts (incubating); https://echarts.apache.org/examples/en/editor.html?c=graph; retrieved Dec. 5, 2020; 2 pages.

Examples—Apache ECharts; https://echarts.apache.org/examples/en/editor.html?c-graph-label-overlap; retrieved Jan. 22, 2021; 1 page.

Hello JGraphT Complete Example | JGraphT; https://jgrapht.org/guide/HelloJGraphT; retrieved Dec. 5, 2020, 4 pages.

Graph (JGraphT : a free Java graph library); https://jgrapht.org/javadoc/org.jgrapht.core/org/jgrapht/Graph.html; retrieved Dec. 5, 2020; 14 pages.

* cited by examiner

_200_

_Data Lineage Information 150_ ↘

```
const data = {
  nodes: [
    {
      id: 'id0',
      name: 'Data Element 0',
    },
    {
      id: 'id1',
      name: 'Data Element 1',
    },
    {
      id: 'id2',
      name: 'Data Element 2',
    },
    {
      id: 'id3',
      name: 'Data Element 3',
    },
    {
      id: 'id4',
      name: 'Data Element 4',
    },
    {
      id: 'id5',
      name: 'Data Element 5',
    },
    {
      id: 'id6',
      name: 'Data Element 6',
    },
    {
      id: 'id7',
      name: 'Data Element 7',
    },
  ], (CONTINUED IN FIG. 2B)
```

```
        (FROM FIG. 2A)

edges: [
        {
          id: 'edge1',
          source: 'id0',
          target: 'id1',
          targetName: 'Data Element 1',
          sourceName: 'Data Element 0',
        },
        {
          id: 'edge2',
          source: 'id0',
          target: 'id2',
          targetName: 'Data Element 2',
          sourceName: 'Data Element 0',
        },
        {
          id: 'edge3',
          source: 'id2',
          target: 'id5',
          targetName: 'Data Element 5',
          sourceName: 'Data Element 2',
        }, (CONTINUED IN FIG. 2C)
```

```
    (FROM FIG. 2B)

{
    id: 'edge4',
    source: 'id3',
    target: 'id2',
    targetName: 'Data Element 2',
    sourceName: 'Data Element 3',
  },
  {
    id: 'edge5',
    source: 'id3',
    target: 'id0',
    targetName: 'Data Element 0',
    sourceName: 'Data Element 3',
  },
  {
    id: 'edge6',
    source: 'id7',
    target: 'id3',
    targetName: 'Data Element 3',
    sourceName: 'Data Element 7',
  },
  {
    id: 'edge7',
    source: 'id4',
    target: 'id3',
    targetName: 'Data Element 3',
    sourceName: 'Data Element 4',
  },
  {
    id: 'edge8',
    source: 'id6',
    target: 'id4',
    targetName: 'Data Element 4',
    sourceName: 'Data Element 6',
  },
],
};
```

*Expanded View 702 of Data Lineage GUI 110*

700

Upstream – 5 Levels

| Name | Type | Source | Target |
|---|---|---|---|
| Data Element 720A | Variable | 0 | 4 |
| Data Element 720B | Rule | 0 | 7 |
| Data Element 720C | Model | 1 | 36 |

Upstream – 4 Levels

| Name | Type | Source | Target |
|---|---|---|---|
| Data Element 720D | Model | 37 | 10 |
| Data Element 720E | Rule | 5 | 2 |
| Data Element 720F | Variable | 0 | 23 |
| Data Element 720G | Variable | 2 | 1 |

*Level-Specific Panel 712A*

*Level-Specific Panel 712B*

… | Up 7 | Up 6 | Up 5 | Up 4 | Up 3 | Up 2 | Up 1 | Down 1 | Down 2 | Down 3 | …

*Selection Window 602*

*Selection Reference 604*

*Slider Navigation Element 410*

_800_

```
┌─────────────────────────────────────────────────────────────────────────┐
│ Access data lineage information that specifies a directed graph indicative of a data lineage │
│ associated with a plurality of data elements, where the plurality of data elements are represented │
│ in the data lineage information as a plurality of nodes, and where, in the directed graph, the │
│ plurality of nodes are connected by a plurality of edges indicative of data lineage relationships │
│ between the plurality of data elements │
│ 802 │
└─────────────────────────────────────────────────────────────────────────┘
```

```
┌─────────────────────────────────────────────────────────────────────────┐
│ Generate a data lineage graphical user interface (GUI) that, for a selected data element of the │
│ plurality of data elements, is usable to navigate different levels of the data lineage associated with │
│ the plurality of data elements in an upstream and downstream direction relative to a particular │
│ level of the selected data element │
│ 804 │
└─────────────────────────────────────────────────────────────────────────┘
```

*FIG. 8*

GRAPHICAL USER INTERFACE TO DEPICT DATA LINEAGE INFORMATION IN LEVELS

PRIORITY CLAIM

The present application claims priority to PCT Appl. No. PCT/CN2021/074652, filed Feb. 1, 2021, which is incorporated by reference herein in its entirety.

BACKGROUND

Technical Field

This disclosure relates generally to graphical user interfaces, and more particularly to a graphical user interface to depict data lineage information in levels.

Description of the Related Art

Many organizations (e.g., providers of web-based services) are collecting and storing increasing amounts of data. For example, to provide web services, a server system may utilize many data elements that have relationships with one another. In many instances, it may be desirable to know the data lineage of the data elements in the system and, due to the difficulty in interpreting this data lineage information, it may be desirable to use one or more graphical components to visually represent the data lineage associated with the data elements. Prior tools for visualizing data lineage information suffer from various technical shortcomings, however, particularly as the number of data elements in a data system increases, preventing users from gaining meaningful insight from the data lineage information.

BRIEF DESCRIPTION OF THE DRAWINGS

FIGS. 2A-2C are listings that depict example data lineage information, according to some embodiments.

FIG. 7 is a block diagram illustrating an additional example expanded view of a data lineage graphical user interface, according to some embodiments.

FIG. 8 is a flow diagram illustrating an example method for generating a data lineage graphical user interface to depict data lineage information in levels, according to some embodiments.

DETAILED DESCRIPTION

Figure 1:
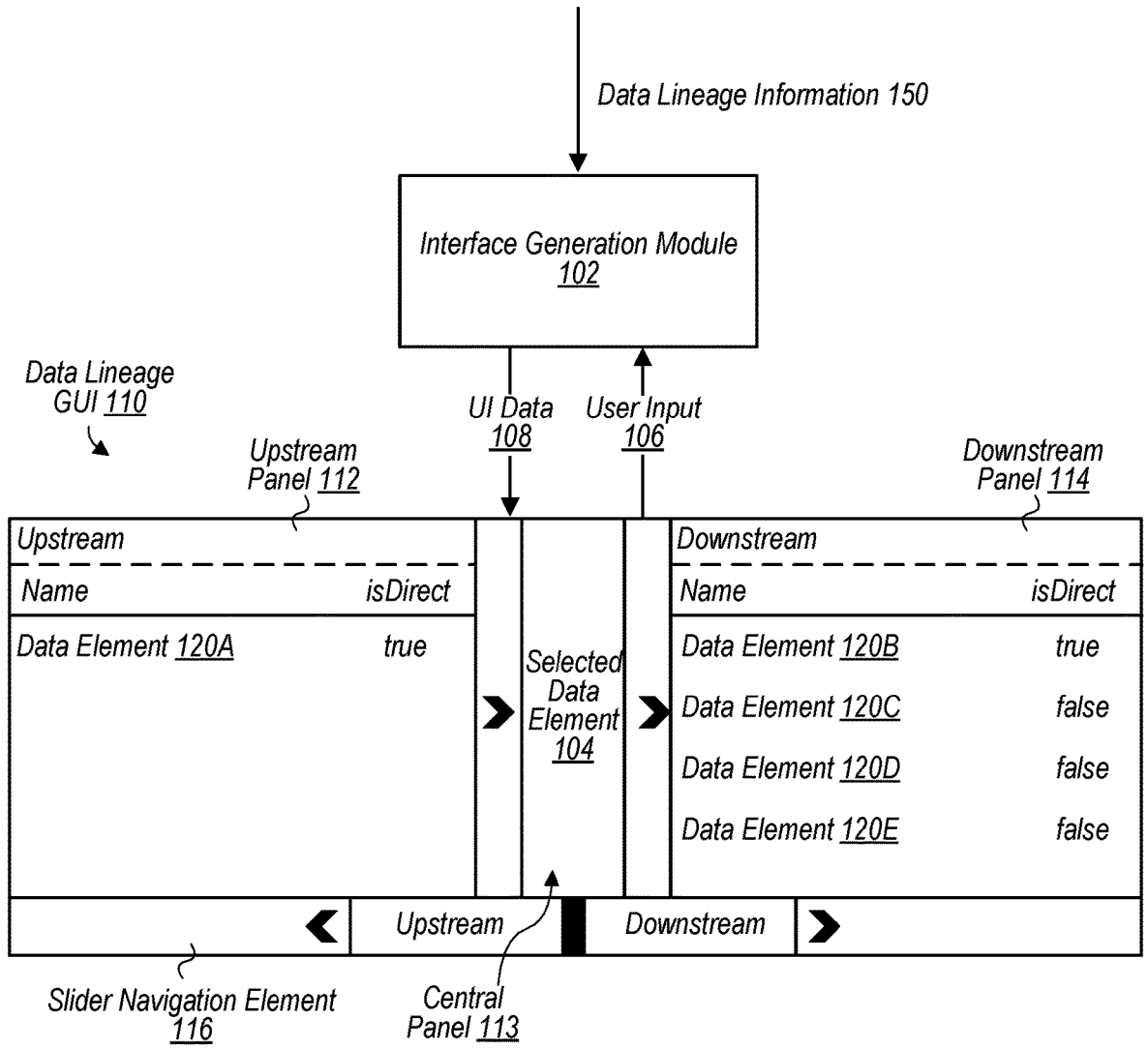
FIG. 1 is a block diagram illustrating an example interface generation module that is operable to generate a graphical user interface to depict data lineage information in levels, according to some embodiments.

Many organizations (e.g., providers of web-based services) are collecting and storing increasing amounts of data. For example, to provide web services, a server system may utilize many "data elements," which, as used herein, refers to an item of structured or unstructured data in a data system. Non-limiting examples of data elements include databases, datasets, database objects (e.g., tables, indices, etc.), rules, models, variables, etc. In a data system (e.g., a server system used to provide a web service), data elements may have relationships with one another. As one non-limiting example, a dataset may include data pulled from multiple different databases, the dataset may be referenced by multiple different models, which, in turn, may utilize multiple rules and variables, etc.

In many instances, particularly as the number of data elements in a data system increases, it may be desirable to know the "data lineage" of the data elements in the system, for example to facilitate troubleshooting data analytics issues. As will be appreciated by one of skill in the art, "data lineage" refers to the data lifecycle and the relationship between data elements in a data system (or a portion thereof), such as the origin of data elements, the way(s) in which the data elements change over time, the referential relationships between data elements, etc. The data lineage associated with a set of interrelated data elements may include multiple "levels" (also referred to herein as "layers") that correspond to the number of referential relationships between the data elements. To illustrate, consider the following four data elements: Data Element A, which is a first database; Data Element B, which is a second database; Data Element C, which is a dataset that pulls records from both of the first and second databases; and Data Element D, which is a statistical model that utilizes the dataset. In this example, Data Elements A and B may be said to be at a different level in the data lineage than Data Element C because there is a referential relationship from Data Elements A and B to Data Element C. Stated differently, Data Element C directly depends on both Data Elements A and B. Similarly, Data Element D may be said to be at a different level than both Data Elements A and B and Data Element C since there is another referential relationship from Data Element C to Data Element D. Further, throughout this disclosure, the terms "upstream" and "downstream" are used to describe the relative position of data elements within the various levels of the data lineage. Continuing with the present example, Data Elements A and B may be said to be "upstream" relative Data Element C, which, in turn, may be considered "upstream" relative to Data Element D. Note that a data element may be considered "upstream" or "downstream" to another data element even if there is not a direct link between those data elements. For example, in the present example, Data Element D would be considered to be one level "downstream" relative to Data Element C and two levels "downstream" relative to Data Elements A and B.

The data lineage between a set of data elements may, in some instances, be provided as information specifying a graph that describes the manner in which the different data elements are related. In many instances, however, this data lineage information is complex, particularly as the number of data elements involved increases (e.g., to thousands, tens of thousands, etc.), making it difficult for a user to gain meaningful insight into the data lineage merely by inspecting the raw information. Accordingly, it is often desirable to visualize data lineage so as to gain a better understanding of the interrelationships between data elements in the data system. Prior tools for visualizing data lineage information suffer from various technical shortcomings. For example, one prior technique is to utilize a graph data visualization component in which each data element is represented visually as a node connected to other nodes based on the data lineage relationships. Such an attempt to visually depict the entirety of the data lineage simultaneously in a single visualization component has various disadvantages, however. For example, using such a data visualization technique, it quickly becomes difficult, if not impossible, for users to interpret the data lineage information, particularly as the number of data elements increases. In a data system that includes a large number (e.g., hundreds, thousands, tens of thousands, etc.) of data elements, such prior data visualization techniques fail to meaningfully convey the data lineage information to the user.

In various embodiments, however, the disclosed techniques provide a technical solution to visualizing data lineage information that overcomes the technical limitations of prior approaches. For example, various disclosed embodiments include generating a data lineage graphical user interface ("GUI") that depicts the data lineage information in levels, allowing a user to quickly and easily navigate between the different (and potentially many) levels of the data lineage. In some embodiments, for example, the disclosed data lineage GUI is operable to receive a user selection of a particular data element and, for that selected data element, navigate the different levels of the data lineage in an upstream and downstream direction relative to the level of the selected data element. According to various embodiments, the disclosed techniques enable a user to investigate the data lineage associated with a selected data element using a GUI that remains legible and intuitive even in instances in which there are a large number of data elements to visualize, improving the ease and efficiency of using the data lineage information and enabling more meaningful insight into the relationship between data elements in the system.

Referring now to FIG. 1, block diagram 100 depicts an example interface generation module 102 that is operable to generate a data lineage GUI 110 based on data lineage information 150, according to some embodiments.

Data lineage information 150, in various embodiments, may specify the data lineage associated with various data elements in a system. For example, data lineage information 150 may be generated based on the various interrelated data elements utilized by a server system to provide one or more web services. Data lineage information 150, according to one non-limiting example, is described in more detail below with reference to FIGS. 2A-2C. For the purposes of the present discussion, note that, in some embodiments, the data lineage information 150 specifies a directed graph indicative of the data lineage associated with a set of data elements. For example, in the data lineage information 150, the data elements may be represented using a set of nodes that are connected by edges indicative of the data lineage relationships between the data elements.

As noted above, in various embodiments the interface generation module 102 is operable to generate the data lineage GUI 110 based on the data lineage information 150. That is, in various embodiments, the interface generation module 102 is operable both to generate various components of the data lineage GUI 110 and, based on the user input 106, generate and update UI data 108 used to populate the various components of the data lineage GUI 110. For example, in some embodiments, the interface generation module 102 may receive user input 106 selecting one of the data elements depicted via the data lineage GUI 110. In response to the user input 106, the interface generation module 102 may generate the data lineage GUI 110 such that, for the selected data element 104 of the plurality of data elements, the GUI 110 is usable to navigate the different levels of the data lineage in both an upstream and downstream direction relative to the level of the selected data element 104. In some such embodiments, for example, the interface generation module 102 may generate the data lineage GUI 110 by analyzing the data lineage information 150 to identify one or more edges associated with a particular node that corresponds to the selected data element 104 and, based on this analysis, identify one or more data elements 120 that are upstream relative to the selected data element and one or more data elements 120 that are downstream relative to the selected data element 104. For example, the interface generation module 102 may determine, based on the one or more edges, a first subset of nodes that are in the upstream direction, in the directed graph specified by the data lineage information 150, relative to the node associated with the selected data element 104. In such an instance, the first subset of nodes may correspond to a first subset of data elements 120 that are at levels that are upstream relative to the selected data element. Similarly, the interface generation module 102 may determine, based on the one or more edges, a second subset of nodes that are in the downstream direction, in the directed graph, relative to the node associated with the selected data element 104, where the second subset of nodes corresponds to a second subset of data elements 120 that are at levels that are downstream relative to the selected data element 104. The interface generation module 102 may generate UI data 108 based on this analysis, which is used to populate the data lineage GUI 110.

In the depicted embodiment, the data lineage GUI 110 includes two main components: a slider navigation element 116 and a "detailed" view that includes upstream panel 112, central panel 113, and downstream panel 114. In various embodiments, the slider navigation element 116 may be used to navigate between the various levels of the data lineage, allowing a user to select one or more levels for which to view additional information in the data lineage GUI 110 (e.g., via the detailed view). The operation of slider navigation element 116, according to some embodiments, is described in detail below with reference to FIGS. 6-7.

In various embodiments, the data lineage GUI 110 allows the user to quickly determine which data elements are upstream and downstream relative to the selected data element. In the depicted embodiment, for example, the detailed view of data lineage GUI 110 includes a central panel 113 that depicts information corresponding to the selected data element 104, an upstream panel 112 that depicts information corresponding to one or more upstream data elements 120 (e.g., data element 120A), and a downstream panel 114 that depicts information corresponding to one or more downstream data elements 120 (e.g., data elements 120B-120E). As shown in FIG. 1, each of the upstream panel 112 and downstream panel 114 may include a table that specifies one or more features of the data elements 120 represented in those panels. In the non-limiting embodiment of FIG. 1, for example, the panels 112 and 114 include tables that have a field for the name of the data element and an "isDirect" field used to denote whether the data elements are directly related to the selected data element 104. Stated differently, the "isDirect" field may be used to indicate whether a given data element, such as data element 120A, is directly linked to the selected data element 104. For example, to make this determination, the interface generation module 102 may analyze the data lineage information 150 to determine whether a node associated with the data element 120A is connected, via an edge, to a node associated with selected data element 104. Note, however, that the fields shown in panels 112 and 114 of FIG. 1 are provided merely as one non-limiting example and, in other embodiments, the data lineage GUI 110 may depict any of various attributes associated with the various data elements 120, as desired. Note that interface generation module 102 may use any of various suitable techniques, programming languages, and libraries in generating the data lineage GUI 110. As one non-limiting example, in embodiments in which interface generation module 102 is implemented (in part or in whole) using the Java™ programming language, the JavaFX package may be used to generate one or more of the graphical or interactive components of the data lineage GUI 110.

Turning now to FIGS. 2A-2C, listings 200-220 depict example data lineage information 150, according to one non-limiting embodiment. As described above, in various embodiments the data lineage information 150 may describes a data lineage associated with a set of data elements and may be used to generate a data lineage GUI 110 that is usable to navigate the different levels of the data lineage relative to a selected data element. Note that, in the depicted embodiment, the data lineage information 150 is specified using JavaScript Object Notation ("JSON"), though any of various suitable formats (e.g., Extensible Markup Language "XML")) may also be used, as desired.

In various embodiments, the data lineage information 150 represents data elements using a set of nodes. In the depicted embodiment, the data lineage information 150 includes information for eight nodes, including an identifier and a name for each. For example, in FIG. 2A, data lineage information 150 specifies a node with the identifier "id0" that corresponds to a data element named "Data Element 0," a node with the identifier "id1" that corresponds to a data element named "Data Element 1," a node with the identifier "id2" that corresponds to a data element named "Data Element 2," etc. Note, however, that this embodiment is provided merely as one non-limiting example and, in other embodiments, any suitable set of data may be included for the various nodes in the data lineage information 150.

Further, in various embodiments, the data lineage information 150 may specify a graph (e.g., a directed graph) in which the various nodes are connected by one or more edges, where the connections are indicative of the data lineage between the data elements. For example, referring now to FIGS. 2B-2C, the data lineage information 150 specifies edges between various nodes. In the depicted embodiment, as a non-limiting example, the data lineage information 150 includes information specifying eight edges. Further, in the depicted embodiment, for each of the edges, the data lineage information 150 specifies an identifier for the edge, a source node identifier at which the edge begins, a target node identifier at which the edge ends, a name of the target node, and a name of the source node. For example, the data lineage information 150 specifies three edges connected to the node id0 corresponding to Data Element 0: "edge1," which starts at node id0 and ends at node id1; "edge2," which starts at node id0 and ends at node id2; and "edge5," which starts at node id3 and ends at node id0. Again, note that this embodiment is provided merely as one non-limiting example and, in other embodiments, various other items of information may be included in the data lineage information 150 for a given edge either in addition to, or instead of, that provided in the present example.

As noted above, in various embodiments, the interface generation module 102 is operable to generate UI data 108 to populate the data lineage GUI 110 using the data lineage information 150. For example, consider an instance in which a user provides user input 106 that selects one of the data elements depicted via the data lineage GUI 110. In such an embodiment, the interface generation module 102 may use the data lineage information 150 to generate the UI data 108 to populate the data lineage GUI 110 so as to depict the various levels of the data lineage and the relative position of the selected data element within those levels.

In various embodiments, to generate this UI data 108 to populate the data lineage GUI 110, the interface generation module may analyze the data lineage information 150 to identify one or more edges that are connected to a particular node that corresponds to the selected data element and, based on those edges, determine a first subset of nodes that are in an upstream direction, in the graph, relative to the particular node and a second subset of nodes that are in a downstream direction, in the graph, relative to the particular node. For example, consider an instance in which the user input 106 indicates a selection of Data Element 0 via the data lineage GUI 110. In this example, the interface generation module 102 may analyze the data lineage information 150 and determine that Data Element 1 and Data Element 2 are in a downstream direction relative to Data Element 0 because, in the data lineage information 150, edge1 and edge2 start at the node id0 corresponding to Data Element 0 and end at nodes id1 and id2 corresponding to Data Element 1 and Data Element 2, respectively. Similarly, the interface generation module 102 may analyze the data lineage information 150 and determine that Data Element 3 is in an upstream direction relative to Data Element 0 because, in the data lineage information 150, edge5 starts at node id3 corresponding to Data Element 3 and ends at node id0 corresponding to Data Element 0.

Figure 3:
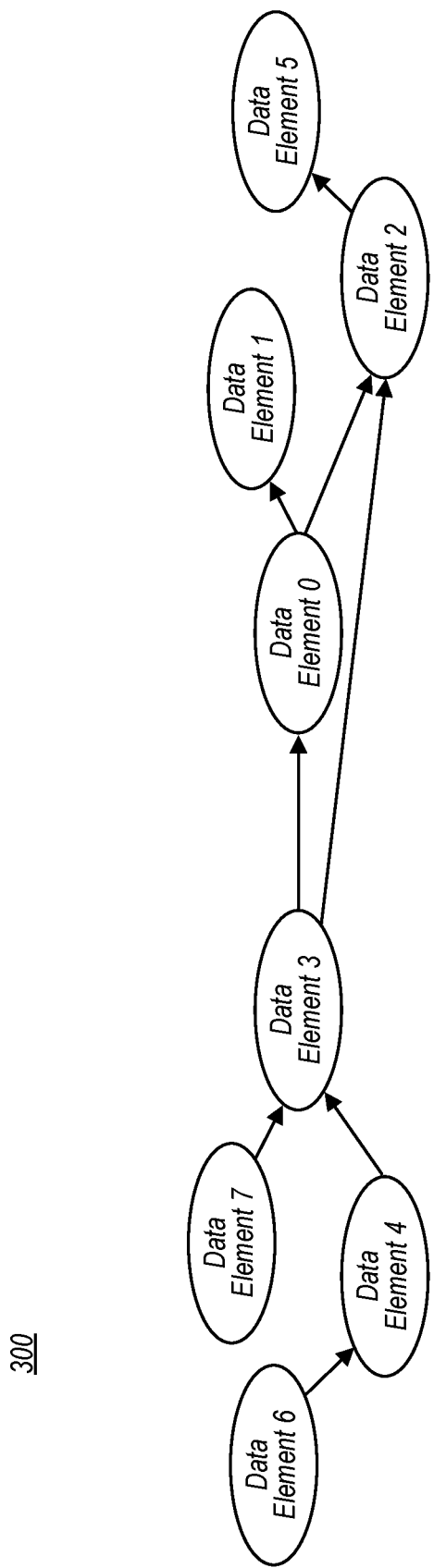
FIG. 3 is a block diagram illustrating an example graph that may be specified by data lineage information, according to some embodiments.

Referring now to FIG. 3, block diagram 300 provides a visual representation of an example directed graph that may be specified in data lineage information 150, according to some embodiments. More specifically, block diagram 300 provides a graphical depiction of the directed graph specified in the data lineage information 150 provided in FIGS. 2A-2C, as a non-limiting example.

Note that, in generating the UI data 108 to populate the data lineage GUI 110 based on a selected data element (e.g., as described above with reference to Data Element 0), the interface generation module 102 may analyze the data lineage information 150 to create a graph data structure in memory that corresponds to the nodes and edges specified in the data lineage information 150. For example, the interface generation module 102 may iterate through the nodes and edges specified in the data lineage information 150, creating corresponding nodes (also referred to as "vertices") and edges in the graph data structure as specified by the data lineage information 150. By iterating through the dependencies specified by the edges in the data lineage information 150, the interface generation module 102 can determine the manner in which the nodes are linked and, accordingly, the data lineage between the corresponding data elements represented by those nodes.

The interface generation module 102 may use any of various suitable techniques to generate the graph data structure based on the data lineage information 150. In one non-limiting embodiment, for example, the interface generation module 102 may use the JGraphT Java class library to perform various operations in generating the data lineage GUI 110 or the UI data 108 to populate the data lineage GUI 110. This embodiment is provided merely as an example, however, and any of various other suitable techniques, including various software libraries utilizing any suitable programming or scripting language, may be used.

Figure 4:
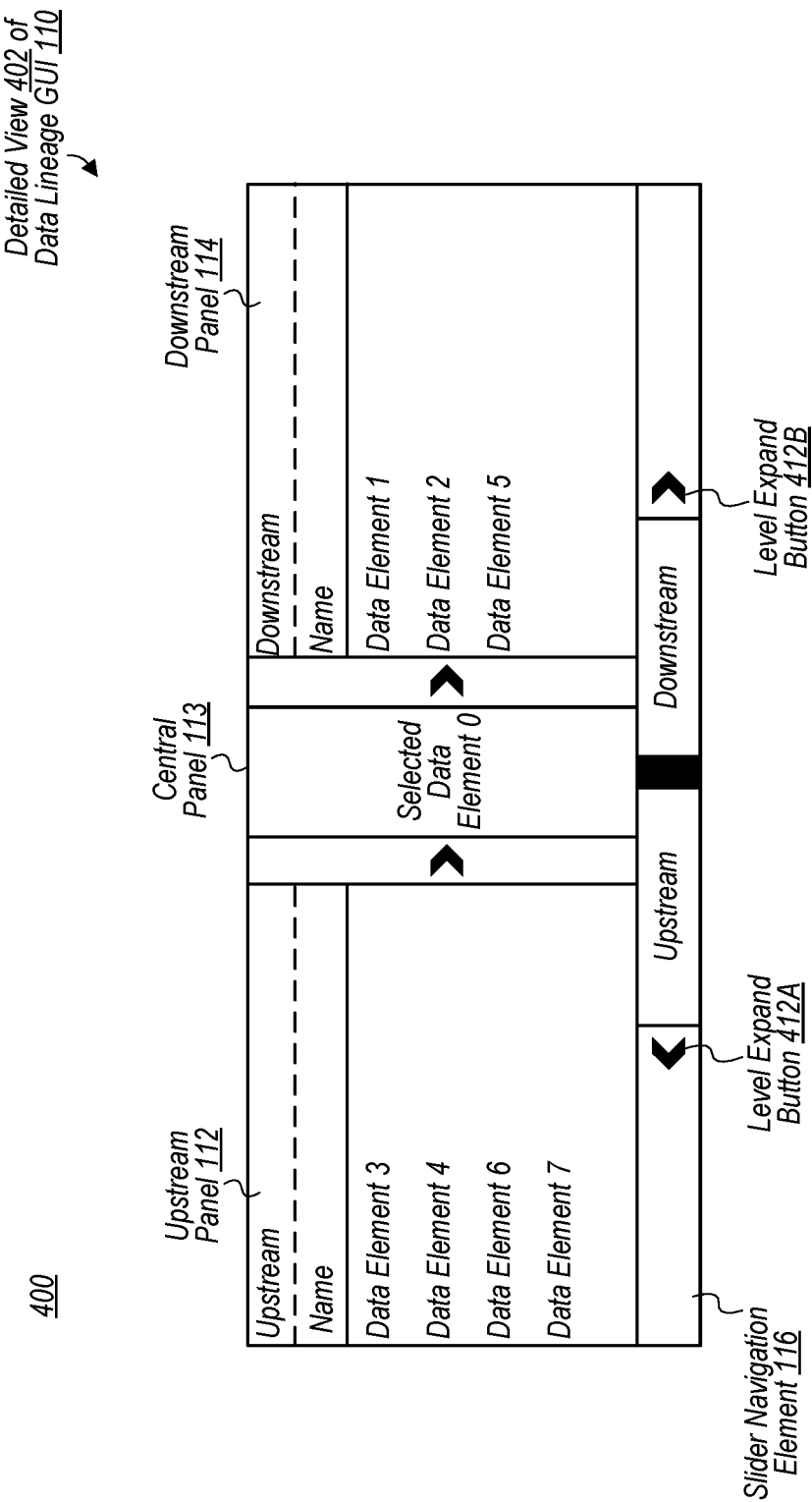
FIG. 4 is a block diagram illustrating an example detailed view of a data lineage graphical user interface, according to some embodiments.

Turning now to FIG. 4, block diagram 400 depicts an example detailed view 402 of the data lineage GUI 110, according to some embodiments. In various embodiments, the detailed view 402 is usable to graphically represent the relative position of a selected data element in the various levels of the data lineage. For instance, continuing with the non-limiting example provided above with reference to FIGS. 2A-2C and FIG. 3 in which user input 106 indicates that Data Element 0 has been selected via the data lineage GUI 110, the interface generation module 102 may generate a detailed view 402 that shows the level at which the Data Element 0 is located in the data lineage as well as the position of the other Data Elements 1-7 relative to the Data Element 0.

In the depicted embodiment, the detailed view 402 includes a central panel 113, an upstream panel 112, and a downstream panel 114. Note, however, that this embodiment is provided merely as one non-limiting example and, in other embodiments, the detailed view 402 may include any suitable combination and arrangement of display elements. In various embodiments, the central panel 113 is used to represent, and graphically depict one or more items of information for, the selected data element (e.g., Data Element 0, in the depicted embodiment). The upstream panel 112, in various embodiments, depicts information corresponding to the data elements that are in the upstream direction relative to the selected data element. For example, in the embodiment of FIG. 4, upstream panel includes a table that lists Data Element 3, Data Element 4, Data Element 6, and Data Element 7, all of which are upstream relative to the selected Data Element 0 in the data lineage specified by data lineage information 150. The downstream panel 114, in various embodiments, depicts information corresponding to data elements that are in the downstream direction relative to the selected data element. For example, in the depicted embodiment, downstream panel 114 includes a table that lists Data Element 1, Data Element 2, and Data Element 5, all of which are downstream relative to the selected Data Element 0 in the data lineage specified by the data lineage information 150. Note that, although the upstream panel 112 and downstream panel 114 of FIG. 4 only provide the names of the data elements that are upstream and downstream, respectively, relative to the selected data element, this embodiment is provided merely as one non-limiting example. In other embodiments, the tables included in upstream panel 112 or downstream panel 114 may include various other fields for the data elements, such as data type, data source, etc.

In the depicted embodiment, detailed view 402 of the data lineage GUI 110 further includes a slider navigation element 116, which is described in detail below with reference to FIGS. 6-7. For the purposes of the present discussion, however, note that slider navigation element 116 is usable to view and navigate between the various levels of the data lineage and allow the user to select one or more levels for which to provide additional information (e.g., using upstream panel 112 or downstream panel 114).

As shown in FIG. 4, in various embodiments the detailed view 402 of the data lineage GUI 110 does not specify the particular levels of the data elements listed in upstream panel 112 and downstream panel 114, instead simply indicating whether these data elements are upstream or downstream relative to the selected data element. In various embodiments, by presenting the data lineage in this manner, the disclosed techniques improve the usability of data lineage GUI 110 by clearly and quickly conveying, to the user, the relative positions of the selected data element in the levels of the data lineage.

In some instances, however, the user may wish to investigate the different levels of the data lineage at a more granular level. Accordingly, in various embodiments, the disclosed data lineage GUI 110 is usable to graphically depict the various data elements that reside at a given level of the data lineage. For example, in the embodiment depicted in FIG. 4, slider navigation element 116 includes level expander buttons 412A and 412B, which may be used to expand one or both of the upstream panel 112 or the downstream panel 114 so as to depict, for each of the upstream and downstream levels, the respective locations of these data elements in the data lineage.

Figure 5:
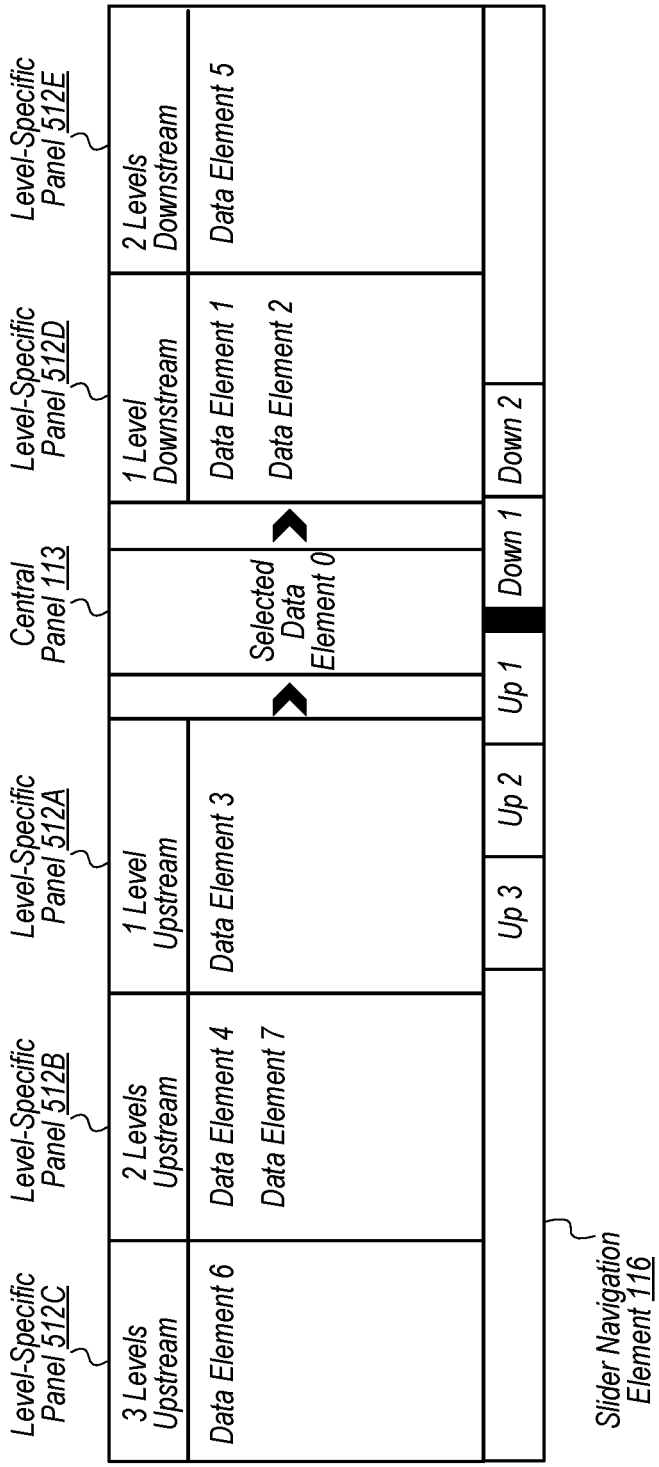
FIG. 5 is a block diagram illustrating an example expanded view of a data lineage graphical user interface, according to some embodiments.

For example, referring now to FIG. 5, block diagram 500 depicts an expanded view 502 of the data lineage GUI 110, according to some embodiments. In various embodiments, the expanded detailed view 502 of the data lineage GUI 110 is usable to graphically depict the level at which the various data elements are located in the data lineage. For example, in the non-limiting depicted embodiment, the expanded detailed view 502 includes five level-specific panels 512A-512E, each of which correspond to a different level of the data lineage and includes a table that provides one or more items of information regarding the data element(s) at that level.

More specifically, level-specific panel 512A corresponds to one level upstream relative to the selected Data Element 0, level-specific panel 512B corresponds to two levels upstream relative to the selected Data Element 0, and level-specific panel 512C corresponds to three levels upstream relative to the selected Data Element 0. Similarly, level-specific panel 512D corresponds to one level downstream relative to the selected Data Element 0 and level-specific panel 512E corresponds to two levels downstream relative to the selected Data Element 0. In the depicted embodiment, level-specific panel 512A includes a table that lists Data Element 3 as being one level upstream relative to Data Element 0, level-specific panel 512B includes a table that lists Data Elements 4 and 7 as being two levels upstream relative to Data Element 0, and level-specific panel 512C includes a table that lists Data Element 6 as being three levels upstream relative to Data Element 0. Similarly, level-specific panel 512D includes a table that lists Data Elements 1 and 2 as being one level downstream relative to Data Element 0 and level-specific panel 512E includes a table that lists Data Element 5 as being two levels downstream relative to Data Element 0.

Note that, in some embodiments, the data lineage GUI 110 uses the selected data element (Data Element 0, in the current example) as its "focal point," computing the levels of the upstream and downstream data elements based on the selected data element. Accordingly, in some embodiments, data elements that are located at the same level in the data lineage as the selected data element may be omitted from the data lineage GUI 110. Referring to the embodiment depicted in FIG. 5, for example, if a user of the data lineage GUI 110 were to select Data Element 1, the content of the data lineage GUI 110 would be re-generated and the data lineage GUI 110 re-populated so as to depict the Data Element 1 in the central panel 113. In some such embodiments, Data Element 2, located at the same level in the data lineage as the now-selected Data Element 1, would be omitted from the data lineage GUI 110. Note, however, that if a new data element (e.g., Data Element 3) were to then be selected, the data lineage GUI 110 may again be re-generated so as to depict Data Element 2 (along with Data Element 1) at the appropriate level corresponding to the newly selected Data Element 3.

Slider navigation element 116, in some embodiments, may include a level-selection window that is usable to select one or more levels of the data lineage for which to view additional information via the data lineage GUI 110 (e.g., using the detailed view 402 of FIG. 4). For example, turning now to FIG. 6, block diagram 600 depicts an example slider navigation element 116 of a data lineage GUI 110, according to some embodiments. In the depicted embodiment, slider navigation element 116 is presented separately from other components of the data lineage GUI 110 (such as the detailed view 402 or expanded detailed view 502, for example), for clarity.

In various embodiments, the slider navigation element 116 depicts the various levels of the data lineage and is usable to select one or more levels for which to view additional information via one or more components of the data lineage GUI 110. For example, in FIG. 6, each of the different levels of the data lineage is represented in the slider navigation element 116 as a separate grid. Additionally, in the depicted embodiment, the slider navigation element 116 includes a selection window 602. In various embodiments, the selection window 302 may be moved, by the user, up and down the slider navigation element 116 to select one or more levels for which to view additional information via the data lineage GUI 110. That is, in various embodiments, by placing the selection window 602 over the grid for a given level, the user may select that level of the data lineage as one for which additional information (e.g., the data elements at the given level) is to be presented via the data lineage GUI 110, as described in more detail below with reference to FIG. 7. In the depicted embodiment, the selection window 602 is dimensioned so as to allow selection of two levels of the data lineage at a time. Note, however, that this embodiment is provided merely as one non-limiting example and, in other embodiments, the selection window 602 may be configured (e.g., as a user preference) such that it is capable of selecting additional or fewer levels at a time.

Figure 6:
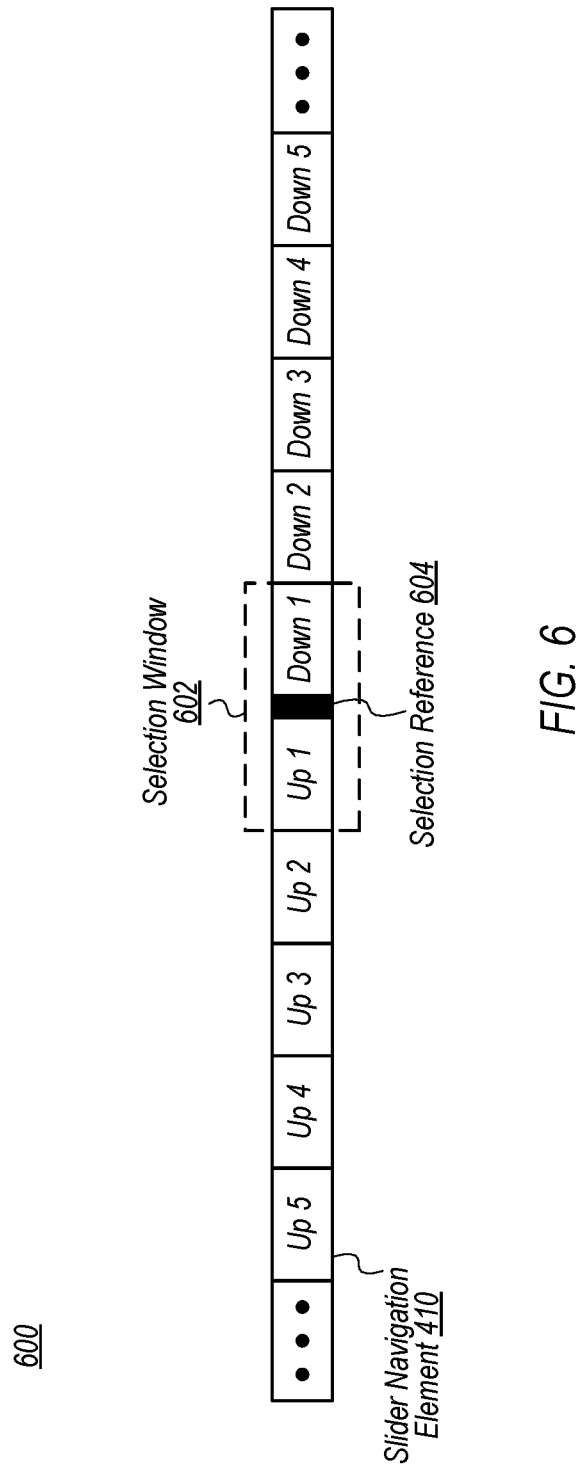
FIG. 6 is a block diagram illustrating an example slider navigation element of a data lineage graphical user interface, according to some embodiments.

In FIG. 6, slider navigation element 116 further includes selection reference 604 (also referred to herein as an "anchor"), which may be used to indicate the level at which the selected data element is located in the data lineage, providing a visual reference to facilitate ease of use of the slider navigation element 116.

Referring now to FIG. 7, block diagram 700 depicts an example expanded view 702 of the data lineage GUI 110, according to some embodiments. More specifically, in the depicted embodiment, the expanded view 702 depicts a slider navigation element 116 in which the selection window 602 has been used to select two levels of the data lineage, associated with a set of data elements 720A-720G, that are four and five levels upstream relative to a level of a selected data element, as indicated using the selection reference 604. Further, in the depicted embodiment, the data lineage GUI 110 includes level-specific panels 712A and 712B, each of which include a table to provide additional information regarding the data elements at the respective levels in the data lineage. For example, in the depicted embodiment, level-specific panels 712A and 712B include fields for the name of the data element, the data type, an identifier of the data source of the data element, an identifier of the data target of the data element. Note, however, that this embodiment is provided merely as one non-limiting example and, in other embodiments, the tables in level-specific panels 712A-712B may include any suitable combination of fields, as desired.

In various embodiments, the data lineage GUI 110 is operable to graphically depict the direct relationship between the various data elements presented via the GUI 110. For example, in some embodiments, the data lineage GUI 110 allows a user to indicate a data element shown in the expanded detailed view 702 and, in response to this indication, is operable to visually emphasize (e.g., highlight) those data elements shown in the expanded detailed view 702 that are directly related (also referred to herein as "linked") to this data element. In the depicted embodiment, for example, a user may select (e.g., using any suitable input technique, such as a cursor, keyboard, touchscreen, etc.) data element 720B in the level-specific panel 712A and the data lineage GUI 110 will visually emphasize the data elements in the level-specific panel 712B that are directly related to data element 720B (data elements 720D and 720G, in the present example). For example, in response to the user selecting the data element 720B, the interface generation module 102 may use the graph data structure described above to identify the node corresponding to data element 720B and any nodes that are directly related (e.g., nodes having edges that begin or terminate at) that node. In such embodiments, the data lineage GUI 110 may then highlight (or otherwise graphically emphasize) those data elements 720 that are directly related to the data element 720B (chosen by the user, in the current example).

Example Methods

Referring now to FIG. 8, a flow diagram illustrating an example method 800 for generating a data lineage GUI to depict data lineage information in levels is depicted, according to some embodiments. In various embodiments, method 800 may be performed by interface generation module 102 of FIG. 1 to generate data lineage GUI 110 based on data lineage information 150. In FIG. 8, method 800 includes elements 802-804. While these elements are shown in a particular order for ease of understanding, other orders may be used. In various embodiments, some of the method elements may be performed concurrently, in a different order than shown, or may be omitted. Additional method elements may also be performed as desired.

At 802, in the illustrated embodiment, the interface generation module 102 accesses data lineage information that specifies a directed graph indicative of a data lineage associated with a plurality of data elements, where the plurality of data elements are represented in the data lineage information as a plurality of nodes and where, in the directed graph, the plurality of nodes are connected by a plurality of edges indicative of data lineage relationships between the plurality of data elements. For example, as described above with reference to FIGS. 2A-2C, the data lineage information 150 may represent various data elements (e.g., Data Elements 0-7, described above) as a set of nodes, providing one or more items of information for the nodes, such as name, identifier, data type, data source, data target, etc. Further, in various embodiments, the data lineage information 150 may specify a set of edges between the nodes, where the edges are indicative of the data lineage relationships between the data elements.

At 804, in the illustrated embodiment, the interface generation module 102 generates a data lineage GUI that, for a selected data element of the plurality of data elements, is usable to navigate the different levels of the data lineage associated with the plurality of data elements in an upstream and downstream direction relative to a particular level of the selected data element. For example, referring to the non-limiting example described above with reference to FIG. 4, when the user provides user input 106 selecting Data Element 0, the interface generation module 102 may generate UI data 108 to populate the data lineage GUI 110 that is usable to navigate the different levels in the data lineage of the Data Elements 0-7.

In various embodiments, the interface generation module 102 generates the UI data 108 used to populate the data lineage GUI 110 based on the data lineage information 150. For example, in some embodiments, method 800 may include analyzing the data lineage information 150 to identify one or more edges associated with a particular node that corresponds to the selected data element. Based on these one or more edges, the interface generation module 102 may determine a first subset of the plurality of nodes that are in an upstream direction, in the directed graph, relative to the particular node, where the first subset of nodes correspond to a first subset of data elements located at upstream levels in the data lineage relative to the selected data element. Similarly, in some embodiments, the interface generation module 102 may determine, based on the one or more edges, a second subset of the plurality of nodes that are in a downstream direction, in the directed graph, relative to the particular node, where the second subset of nodes correspond to a second subset of data elements located at downstream levels in the data lineage relative to the selected data element.

As noted above, in some embodiments the data lineage GUI 110 may be used to present a "detailed" view, as described above in reference to FIG. 4. In some such embodiments, the data lineage GUI 110 may include a detailed view 402 that depicts a central panel 113 depicting information corresponding to the selected data element, an upstream panel 112 depicting information corresponding the first subset of data elements located at the upstream levels, and a downstream panel 114 that depicts information corresponding to the second subset of data elements located at the downstream levels. Further, in some embodiments, the data lineage GUI 110 may include an expanded view that depicts level-specific information for the different levels of the data lineage, as described above with reference to FIGS. 5 and 7. In some such embodiments, method 800 may include receiving, via the data lineage GUI 110, user input 106 indicating a first one of the upstream levels and presenting, via the expanded view, a first level-specific panel that corresponds to the first upstream level and depicts information corresponding to one or more data elements, of the first subset of data elements, that are located at the first upstream level. Further, as noted above with reference to FIG. 7, the disclosed data lineage GUI 110 may be operable to visually emphasize linked data elements. For example, in some embodiments, method 800 may include the interface generation module 102 receiving, via the expanded view 702, a selection of a first one of the one or more data elements (e.g., Data Element 702B) that are located at the first upstream level. In response to this selection, the data lineage GUI 110 may visually emphasizing a second data element (e.g., Data Element 702D) presented in a second level-specific panel (e.g., level-specific panel 712B) in the expanded view 702, where the second level-specific panel corresponds to a second one of the upstream levels, and where, in the directed graph, a second node corresponding to the second data element is directly connected, by one of the plurality of edges, to a first node corresponding to the first data element.

Example Computer System

Figure 9:
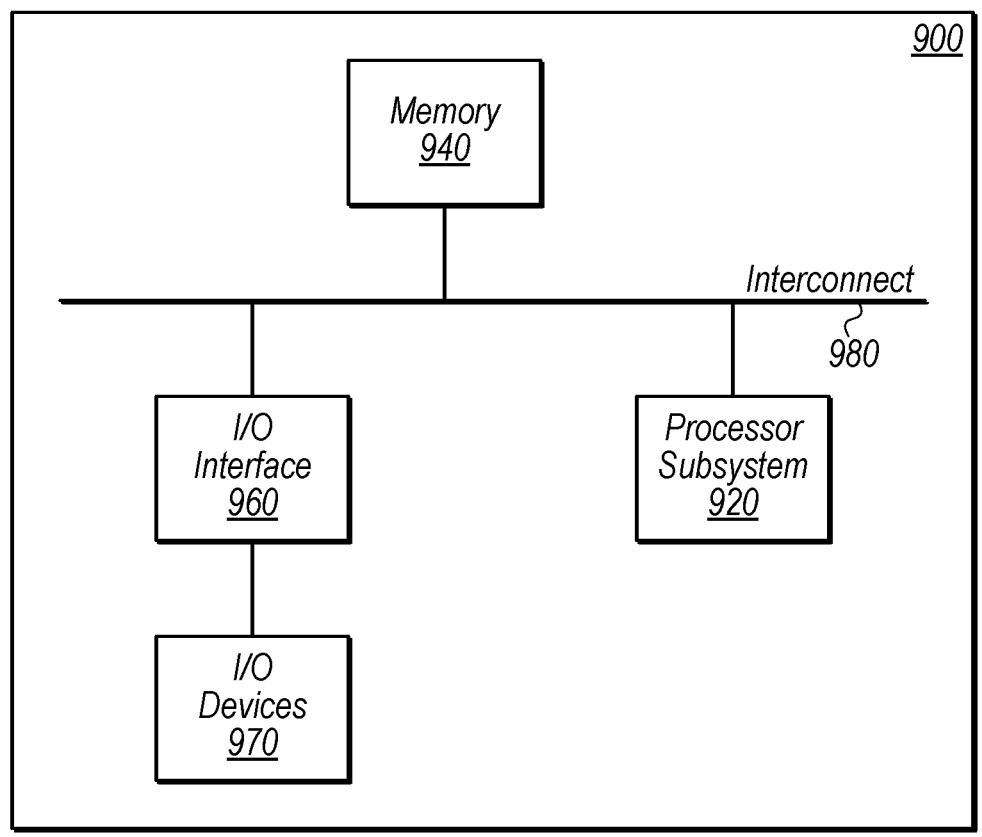
FIG. 9 is a block diagram illustrating an example computer system, according to some embodiments.

Referring now to FIG. 9, a block diagram of an example computer system 900 is depicted, which may implement one or more computer systems utilized to implement the disclosed techniques, according to various embodiments. For example, in some embodiments, computer system 900 may be used to host interface generation module 102 to generate a data lineage GUI 110 based on data lineage information 150, as described above. Computer system 900 includes a processor subsystem 920 that is coupled to a system memory 940 and I/O interfaces(s) 960 via an interconnect 980 (e.g., a system bus). I/O interface(s) 960 is coupled to one or more I/O devices 970. Computer system 900 may be any of various types of devices, including, but not limited to, a server computer system, personal computer system, desktop computer, laptop or notebook computer, mainframe computer system, server computer system operating in a data-center facility, tablet computer, handheld computer, workstation, network computer, etc. Although a single computer system 900 is shown in FIG. 9 for convenience, computer system 900 may also be implemented as two or more computer systems operating together.

Processor subsystem 920 may include one or more processors or processing units. In various embodiments of computer system 900, multiple instances of processor subsystem 920 may be coupled to interconnect 980. In various embodiments, processor subsystem 920 (or each processor unit within 920) may contain a cache or other form of on-board memory.

System memory 940 is usable to store program instructions executable by processor subsystem 920 to cause system 900 perform various operations described herein. System memory 940 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 900 is not limited to primary storage such as system memory 940. Rather, computer system 900 may also include other forms of storage such as cache memory in processor subsystem 920 and secondary storage on I/O devices 970 (e.g., a hard drive, storage array, etc.). In some embodiments, these other forms of storage may also store program instructions executable by processor subsystem 920.

I/O interfaces 960 may be any of various types of interfaces configured to couple to and communicate with other devices, according to various embodiments. In one embodiment, I/O interface 960 is a bridge chip (e.g., Southbridge) from a front-side to one or more back-side buses. I/O interfaces 960 may be coupled to one or more I/O devices 970 via one or more corresponding buses or other interfaces. Examples of I/O devices 970 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 970 includes a network interface device (e.g., configured to communicate over WiFi, Bluetooth, Ethernet, etc.), and computer system 900 is coupled to a network via the network interface device.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments described herein are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—"[entity] configured to [perform one or more tasks]"—is used herein to refer to structure (i.e. something physical). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for [performing a function]" construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

In this disclosure, various "modules" operable to perform designated functions are shown in the figures and described in detail (e.g., interface generation module 102). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

What is claimed is:

1. A non-transitory, computer-readable medium having instructions stored thereon that are executable by a computer system to perform operations comprising:
   accessing data lineage information that specifies a directed graph indicative of a data lineage associated with a plurality of data elements, wherein the plurality of data elements are represented in the data lineage information as a plurality of nodes, and wherein, in the directed graph, the plurality of nodes are connected by a plurality of edges indicative of data lineage relationships between the plurality of data elements;
   generating a data lineage graphical user interface (GUI) that, for a selected data element of the plurality of data elements, is usable to navigate different levels of the data lineage associated with the plurality of data elements in an upstream and downstream direction relative to a particular level of the selected data element, wherein the data lineage GUI includes two or more selectable views, including:
      a compacted view that displays respective upstream and downstream subsets of the plurality of data elements without indications of respective levels between the displayed data elements in a given subset;
      an expanded view that displays the respective upstream and downstream subsets with indications of respective levels between the displayed data elements in a given subset; and
      a slider navigation element including respective controls for the upstream and downstream subsets.

2. The non-transitory, computer-readable medium of claim 1, wherein the generating the data lineage GUI includes:
   analyzing the data lineage information to identify one or more edges associated with a particular node corresponding to the selected data element;
   determining, based on the one or more edges, a first subset of the plurality of nodes that are in the upstream direction, in the directed graph, relative to the particular node, wherein the first subset of nodes correspond to the upstream subset of data elements; and
   determining, based on the one or more edges, a second subset of the plurality of nodes that are in the downstream direction, in the directed graph, relative to the particular node, wherein the second subset of nodes corresponds to the downstream subset of data elements.

3. The non-transitory, computer-readable medium of claim 1, wherein the slider navigation element includes:
   an upstream expander button used to switch the upstream subset of data elements between the compacted and expanded views; and
   a downstream expander button used to switch the downstream subset of data elements between the compacted and expanded views;
   wherein the upstream and downstream expander buttons are operable independently of each other.

4. The non-transitory, computer-readable medium of claim 1, wherein the operations further comprise:
   receiving, via the data lineage GUI, user input indicating a first one of one or more upstream levels; and
   presenting, via the expanded view, a first level-specific panel that corresponds to the first upstream level and depicts information corresponding to one or more data elements, of the upstream subset of data elements, that are located at the first upstream level.

5. The non-transitory, computer-readable medium of claim 4, wherein the operations further comprise:
   receiving, via the expanded view, a selection of a first one of the one or more data elements that are located at the first upstream level; and
   visually emphasizing a second data element presented in a second level-specific panel in the expanded view, wherein the second level-specific panel corresponds to a second one of the upstream levels, and wherein, in the directed graph, a second node corresponding to the second data element is directly connected, by one of the plurality of edges, to a first node corresponding to the first data element.

6. The non-transitory, computer-readable medium of claim 1, wherein the slider navigation element depicts a plurality of the different levels of the data lineage, and
   wherein the slider navigation element includes a level-selection window that is usable to select one or more levels, of the plurality of the different levels of the data lineage, for which to depict additional information via a detailed view of the data lineage GUI.

7. The non-transitory, computer-readable medium of claim 6, wherein each of the different levels is depicted, via the slider navigation element as a corresponding grid; and
   wherein the operations further comprise:
      receiving, via the slider navigation element, a selection of a first level, of the plurality of the different levels of the data lineage, using the level-selection window; and
      presenting, via the expanded view of the data lineage GUI, a first panel that depicts information corresponding to one or more of the plurality of data elements that are associated with the first level.

8. A method, comprising:
accessing, by a computer system, data lineage information that specifies a directed graph indicative of a data lineage associated with a plurality of data elements, wherein the plurality of data elements are represented in the data lineage information as a plurality of nodes, and wherein, in the directed graph, the plurality of nodes are connected by a plurality of edges indicative of data lineage relationships between the plurality of data elements; and
generating, by the computer system, a data lineage graphical user interface (GUI) that, for a selected data element of the plurality of data elements, is usable to navigate different levels of the data lineage associated with the plurality of data elements in an upstream and downstream direction relative to a particular level of the selected data element, wherein the data lineage GUI includes two or more selectable views, including:
a compacted view that displays respective upstream and downstream subsets of the plurality of data elements without indications of respective levels between the displayed data elements in a given subset;
an expanded view that displays the respective upstream and downstream subsets with indications of respective levels between the displayed data elements in a given subset; and
a slider navigation element including respective controls for the upstream and downstream subsets.

9. The method of claim 8, wherein the generating the data lineage GUI includes:
analyzing the data lineage information to identify one or more edges associated with a particular node corresponding to the selected data element;
determining, based on the one or more edges, a first subset of the plurality of nodes that are in the upstream direction, in the directed graph, relative to the particular node, wherein the first subset of nodes correspond to the upstream subset of data elements; and
determining, based on the one or more edges, a second subset of the plurality of nodes that are in the downstream direction, in the directed graph, relative to the particular node, wherein the second subset of nodes corresponds to the downstream subset of data elements.

10. The method of claim 8, wherein the slider navigation element includes:
an upstream expander button that, when activated, indicates a level of separation from the selected data element to ones of the data elements in the upstream subset; and
a downstream expander button that, when activated, indicates a level of separation from the selected data element to ones of the data elements in the downstream subset;
wherein the upstream and downstream expander buttons are operable independently of each other.

11. The method of claim 8, further comprising:
receiving, by the computer system via the data lineage GUI, user input indicating a first one of one or more upstream levels; and
presenting, by the computer system via the expanded view, a first level-specific panel that corresponds to the first upstream level and depicts information corresponding to one or more data elements, of the upstream subset of data elements, that are located at the first upstream level.

12. The method of claim 11, further comprising:
receiving, by the computer system via the expanded view, a selection of a first one of the one or more data elements that are located at the first upstream level; and
visually emphasizing, by the computer system, a second data element presented in a second level-specific panel in the expanded view, wherein the second level-specific panel corresponds to a second one of the upstream levels, and wherein, in the directed graph, a second node corresponding to the second data element is directly connected, by one of the plurality of edges, to a first node corresponding to the first data element.

13. The method of claim 8, wherein the slider navigation element depicts a plurality of the different levels of the data lineage, and
wherein the slider navigation element includes a level-selection window that is usable to select one or more levels, of the plurality of the different levels of the data lineage, for which to depict additional information via a detailed view of the data lineage GUI.

14. The method of claim 13, wherein each of the different levels is depicted, via the slider navigation element as a corresponding grid; and wherein the method further comprises:
receiving, via the slider navigation element, a selection of a first level, of the plurality of the different levels of the data lineage, using the level-selection window; and
presenting, via the expanded view of the data lineage GUI, a first panel that depicts information corresponding to one or more of the plurality of data elements that are associated with the first level.

15. A system, comprising:
at least one processor;
a non-transitory, computer-readable medium having instructions stored thereon that are executable by the at least one processor to cause the system to:
access data lineage information that specifies a directed graph indicative of a data lineage associated with a plurality of data elements, wherein the plurality of data elements are represented in the data lineage information as a plurality of nodes, and wherein, in the directed graph, the plurality of nodes are connected by a plurality of edges indicative of data lineage relationships between the plurality of data elements; and
generate a data lineage graphical user interface (GUI) that, for a selected data element of the plurality of data elements, is usable to navigate different levels of the data lineage associated with the plurality of data elements in an upstream and downstream direction relative to a particular level of the selected data element, wherein the data lineage GUI includes two or more selectable views, including:
a compacted view that displays respective upstream and downstream subsets of the plurality of data elements without indications of respective levels between the displayed data elements in a given subset;
an expanded view that displays the respective upstream and downstream subsets with indications of respective levels between the displayed data elements in a given subset; and
a slider navigation element including respective controls for the upstream and downstream subsets.

16. The system of claim 15, wherein generating the data lineage GUI includes:

analyzing the data lineage information to identify one or more edges associated with a particular node corresponding to the selected data element;

determining, based on the one or more edges, a first subset of the plurality of nodes that are in an upstream direction, in the directed graph, relative to the particular node, wherein the first subset of nodes correspond to the upstream subset of data; and determining, based on the one or more edges, a second subset of the plurality of nodes that are in a downstream direction, in the directed graph, relative to the particular node, wherein the second subset of nodes corresponds to the downstream subset of data elements.

17. The system of claim 15, wherein the slider navigation element includes:

an upstream expander button that, when activated, indicates a level of separation from the selected data element to ones of the data elements in the upstream subset; and a downstream expander button that, when activated, indicates a level of separation from the selected data element to ones of the data elements in the downstream subset;

wherein the upstream and downstream expander buttons are operable independently of each other.

18. The system of claim 15, wherein the instructions are further executable to cause the system to:

receiving, via the data lineage GUI, user input indicating a first one of one or more upstream levels; and presenting, via the expanded view, a first level-specific panel that corresponds to the first upstream level and depicts information corresponding to one or more data elements, of the upstream subset of data elements, that are located at the first upstream level.

19. The system of claim 18, wherein the instructions are further executable to cause the system to:

receiving, via the expanded view, a selection of a first one of the one or more data elements that are located at the first upstream level; and visually emphasizing a second data element presented in a second level-specific panel in the expanded view, wherein the second level-specific panel corresponds to a second one of the upstream levels, and wherein, in the directed graph, a second node corresponding to the second data element is directly connected, by one of the plurality of edges, to a first node corresponding to the first data element.

20. The system of claim 15, wherein the slider navigation element depicts a plurality of the different levels of the data lineage, and wherein the slider navigation element includes a level-selection window that is usable to select one or more levels, of the plurality of the different levels of the data lineage, for which to depict additional information via a detailed view of the data lineage GUI.

* * * * *